US012710670B2

(12) United States Patent
Shtukater et al.

(10) Patent No.: US 12,710,670 B2

(45) Date of Patent: Aug. 18, 2026

(54) MULTIMEDIA SYSTEM AND METHOD FOR AR/VR SMART CONTACT LENS

(71) Applicant: RaayonNova LLC, Fair Lawn, NJ (US)

(72) Inventors: Aleksandr Shtukater, Fair Lawn, NJ (US); Aleksandr Ziskis, Brooklyn, NY (US)

( * ) Notice: Subject to any disclaimer, the term of this patent is extended or adjusted under 35 U.S.C. 154(b) by 688 days.

(21) Appl. No.: 18/100,112

(22) Filed: Jan. 23, 2023

(65) Prior Publication Data

US 2023/0236442 A1 Jul. 27, 2023

Related U.S. Application Data

(60) Provisional application No. 63/302,124, filed on Jan. 23, 2022.

(51) Int. Cl.
*G02C 11/00* (2006.01)
*G02C 7/08* (2006.01)
*H04N 21/488* (2011.01)

(52) U.S. Cl.
CPC .............. *G02C 11/10* (2013.01); *G02C 7/083* (2013.01); *H04N 21/4884* (2013.01)

(58) Field of Classification Search
CPC ........ G02C 11/10; G02C 7/083; G02C 7/086; G02C 7/04; H04N 21/4884; H04N 21/4341
USPC .......................................................... 351/158
See application file for complete search history.

(56) References Cited

U.S. PATENT DOCUMENTS 6,447,449 B1 9/2002 Fleischman et al.
6,579,235 B1 6/2003 Abita et al.
6,749,568 B2 6/2004 Fleischman et al.
7,169,106 B2 1/2007 Fleischman et al.
7,639,845 B2 12/2009 Utsunomiya
8,241,574 B2 8/2012 Burles et al.
8,336,387 B2 12/2012 Tai et al.
8,385,998 B2 2/2013 Zhang et al.
8,857,981 B2 10/2014 Pletcher et al.
8,864,305 B2 10/2014 Pletcher et al.
8,870,370 B1 10/2014 Otis et al.
8,960,898 B1 2/2015 Etzkorn et al.
8,960,899 B2 2/2015 Etzkorn
8,965,478 B2 2/2015 Liu
8,971,978 B2 3/2015 Ho et al.
(Continued)

OTHER PUBLICATIONS

U.S. Appl. No. 13/780,135, filed Aug. 28, 2014, Johnson & Johnson Vision Care Inc.

*Primary Examiner* — William R Alexander

(57) ABSTRACT

Multimedia enabled Smart Contact Len (SCL)s system is presented. An SCL system with an embedded display and optional paired audio output device(s) or other multimedia output device(s). The system is capable to accept multimedia stream, split it into constituent media specific type of data streams and output the separated data into the type specific output device with near the eye auxiliary multimedia data processing device. Which will help process different type data such a audio, image, video, text and other types of data & providing a interactive data processing smart contact lens.

An SCL system with an embedded display and integrated into the SCL forward facing image capture device paired with integrated or remote audio capture device capture multimedia data producing one unified multimedia data stream for storage or data transmission.

22 Claims, 6 Drawing Sheets

(56) References Cited

U.S. PATENT DOCUMENTS

| | | | |
|---|---|---|---|
| 8,979,271 | B2 | 3/2015 | Pletcher et al. |
| 8,985,763 | B1 | 3/2015 | Etzkorn et al. |
| 8,986,240 | B2 | 3/2015 | Dos Santos et al. |
| 8,989,834 | B2 | 3/2015 | Ho et al. |
| 9,047,512 | B2 | 6/2015 | Otis et al. |
| 9,054,079 | B2 | 6/2015 | Etzkorn |
| 9,055,902 | B2 | 6/2015 | Liu |
| 9,063,351 | B1 | 6/2015 | Ho et al. |
| 9,111,473 | B1 | 8/2015 | Ho et al. |
| 9,113,829 | B2 | 8/2015 | Etzkorn |
| 9,125,721 | B2 | 9/2015 | Field |
| 9,155,653 | B2 | 10/2015 | Field |
| 9,158,133 | B1 | 10/2015 | Pletcher et al. |
| 9,161,712 | B2 | 10/2015 | Etzkorn |
| 9,176,332 | B1 | 11/2015 | Etzkorn et al. |
| 9,184,698 | B1 | 11/2015 | Wiser et al. |
| 2004/0027536 | A1 | 2/2004 | Blum et al. |
| 2006/0173497 | A1 | 8/2006 | Mech |
| 2008/0208335 | A1 | 8/2008 | Blum |
| 2019/0287486 | A1* | 9/2019 | Khoury .................. G06F 3/011 |
| 2021/0290441 | A1* | 9/2021 | Wiemer ................... A61F 2/16 |
| 2021/0311328 | A1* | 10/2021 | Mirjalili ................ G02C 7/049 |
| 2022/0066549 | A1* | 3/2022 | Bhat ................... G02B 27/017 |
| 2022/0357597 | A1* | 11/2022 | Miller .............. H02J 7/007188 |

* cited by examiner

MULTIMEDIA SYSTEM AND METHOD FOR AR/VR SMART CONTACT LENS

FIELD OF INVENTION

The present invention relates to a smart contact lenses SCL system with an embedded display and optional paired audio or video input device(s) or other multimedia input device(s). The system is able to take multiple data inputs from different input sensors, like video or audio, and combine the multiple data streams into one multimedia stream. Consequently, the system can store combined information or transmit for further processing or for output to other output devices.

BACKGROUND OF THE INVENTION

The smart contact lens (SCL) system comprises at least one smart contact lens device coupled with near the eye auxiliary multimedia data processing device systems for so-called "virtual reality" or "augmented reality" experiences, in which digitally reproduced images or portions thereof are presented to a user in a way that makes them seem, or may be perceived as, real, have been made possible by advances in computing and display technology. An augmented reality (AR) scenario typically involves the presentation of digital or virtual image information as an addition to visualisation of the real world around the user, while a virtual reality (VR) scenario typically involves the presentation typically involves the presentation of digital or virtual image information without transparency to other actual real-world visual input. A user of AR technology, for instance, might be able to see one or more virtual objects layered over or amidst real-world objects in an augmented reality scene.

Although there are a few optical configurations (such as head-mounted glasses, such as Google Glass, Occulus Rift, etc.), none of these configurations is ideal for presenting a rich, immersive experience such as one that the present invention can provide by processing live data input and superimposing it with the existing modules being per-set or being programmed to over lay upon real life visuals. The AR/VR smart contact lens system is able to take multiple data inputs from different input sensors, like video or audio, and combine the multiple data streams into one multimedia stream. Consequently, the system can store combined information or transmit for further processing or for output to other output devices with the help of the multimedia processor.

such can be attained by a transparent, semi-transparent, or opaque display being integrated into the contact lens, an image or video that is superimposed onto the user's view of real-world objects. Such an embedded display is positioned in relation to the human eye and is naturally, spatially associated with it and locked in. Only a portion of the image present in the centre of the embedded display would be in sharp focus, and a user would not be able to perceive other portions of the superimposed image in clear focus because the embedded display will be shifting with every movement of the eye. The multimedia data processing components will help display the altered real time data on the embedded contact lens display making smart contact lenses with AR or VR capabilities realistic and helpful requires giving users the option to choose a selective data stream and process it so the visual form is fed to the display/projector embedded into the contact lens substrate and audio form is fed to the audio output device. This feature does tag along with the data stream identification filtration to super impose the gathered input for better interactive data processing smart contact lens.

SUMMARY OF THE INVENTION

The smart contact lens (SCL) system and corresponding method of operation of such system are disclosed. SCL system comprises at least one smart contact lens device coupled with near the eye auxiliary multimedia data processing device. Where multimedia data is split into at least two visual form and audio form, whereas visual form is fed to the display/projector embedded into the contact lens substrate and audio form is fed to the audio output device.

Definitions & Terms

SCL—Smart contact lens; contact lens worn over the cornea of the eye with a variety with variety of embedded electronic, electro-optical or optical components.

Active Contact Lens should be taken to be synonymous with smart contact lens.

Power supply module is a component of SCL system optionally comprising micro batteries or a wired charging component consisting of coil inductive wire and remote RF transmitter.

For the purposes of present patent application, the word transceiver shall be defined as any device that is capable of either both transmission and reception, or transmission only, or reception only of information signals.

Multimedia source data stream—initial or source data set containing data of different types.

Multimedia data stream—data set containing data of different types, for example audio, image, video, text and other types of data.

Multimedia stream—data set containing data of different typeS, for example audio, image, video, text and other types of data.

Pre-processing—step connotes preliminary processing step in order to perform initial analysis or classification of the dataset. Pre-processing may also refer to manipulation or dropping of data before it is used in order to ensure or enhance performance.

Image capture sensor—for the purposes of present patent application should be interpreted to mean any sensor capable of registering light condition and to be used to for either image or video capture.

Term Image capture sensor—should be interpreted to mean to have identical meaning as term Image capture device. Image capture sensor may also comprise IR light sensor and a variety and variety of other night vision sensors. Term Image sensor for the purposes of present patent application should be interpreted to mean and to be semantically equivalent to the image capture sensor.

Video capture sensor—for the purposes of present patent application should be interpreted to mean any sensor capable of registering light condition and to be used to for either image or video capture.

Term Video capture sensor—should be interpreted to mean to have identical meaning as term Video capture device.

Term Video sensor for the purposes of present patent application should be interpreted to mean and to be semantically equivalent to the video capture sensor. For the purposes of present disclosure stream and datasets are to be considered as synonyms concepts.

DESCRIPTION OF THE DRAWINGS

The following drawings, in which a currently preferred embodiment of the invention will now be illustrated by way of example, will help you better understand the features that are believed to be characteristic of the present disclosure, as well as its structure, Arrangement, use, and method of operation, as well as additional objectives and advantages. However, it is clearly acknowledged that the drawings are just meant to serve as examples and descriptions and are not meant to serve as a definition of the invention's boundaries. Now, examples of embodiments of this disclosure will be provided in conjunction with the accompanying drawings, where.

DETAILED DESCRIPTION OF THE INVENTION

Figure 1:
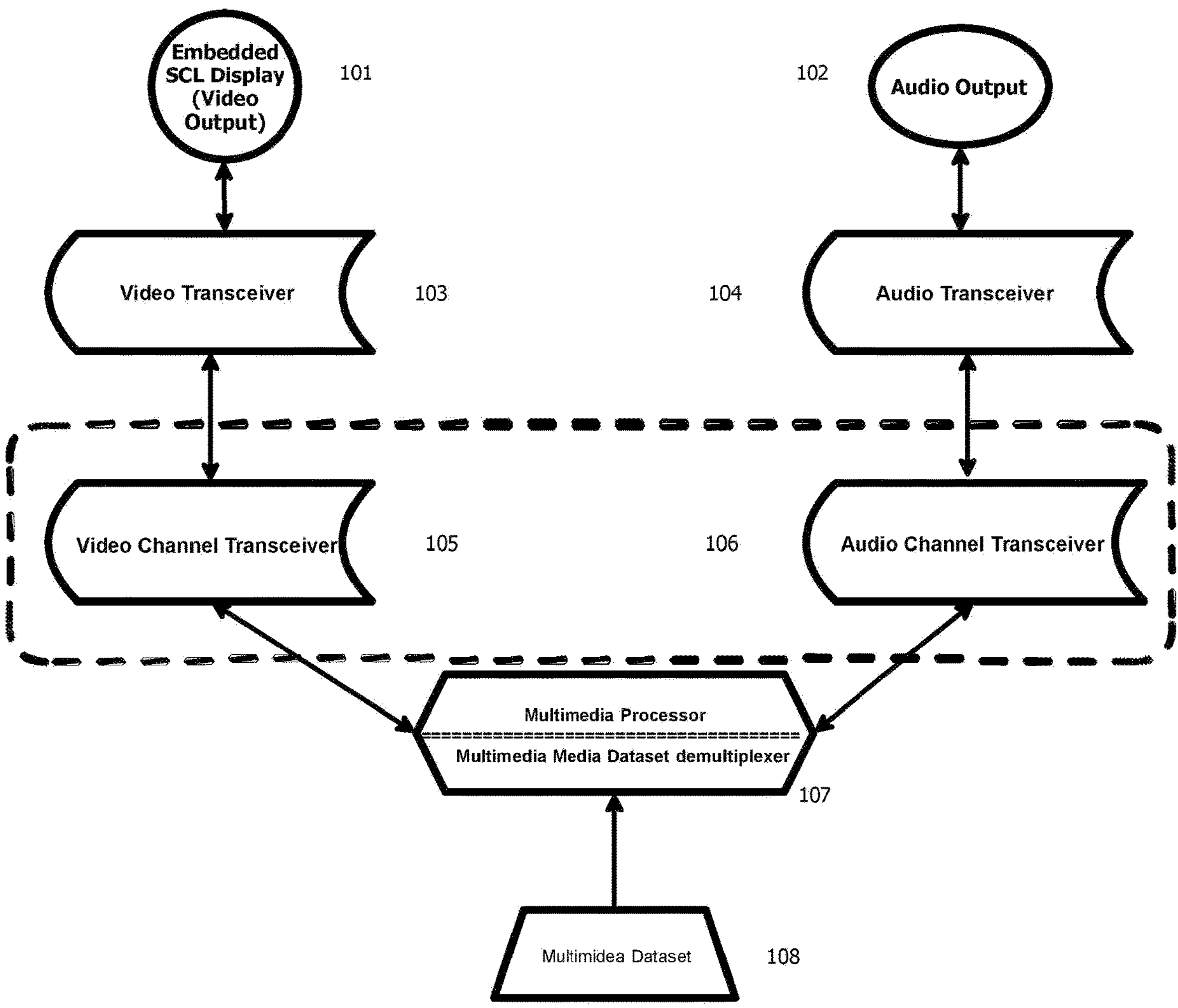
FIG. 1 is a flow diagram illustrating exemplary operation of the AR/VR smart contact lens with detailing components of multimedia data processing device.

The foregoing summary, as well as the following detailed description of certain embodiments of the subject matter set forth herein, will be better understood when read in conjunction with the appended drawings. As used herein, an element or step recited in the singular and preceded with the word "a" or "an" should be understood as not excluding the plural form of said elements or steps, unless such exclusion is explicitly stated. In this document, the term "or" is used to refer to a non-exclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory or any other type of memory. In one embodiment memory may be maybe implemented as a binary system or in one embodiment memory may be maybe implemented as a quantum system. Present disclosure should not be construed as being limited to any specific memory system or architecture; presently disclosed system would work with any memory architecture and memory arrangement. The above memory types are exemplary only, and are thus not limiting as to the types of memory usable for storage of a computer program.

As used herein, the term image refers to a dataset containing color information representing an image. Image maybe synthetically produced by a computer software or hardware or may be taken with an image sensor. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

The various embodiments and/or components, for example, the modules, elements, or components and controllers therein, also may be implemented as part of one or more computers or processors. The computer or processor may include a computing device, an input device, a display unit and an interface, for example, for accessing the Internet or Intranet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor. Processor may have onboard memory or memory maybe remotely situated.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The systems and subsystems described in present patent application may be implemented on nano scale or micro scale and may comprise any MEMS or other types of electronics. The above examples are exemplary only, and are thus not intended to limit in any way the definition and/or meaning of the term "computer". In the following detailed description, reference is made to the accompanying drawings which form a part hereof, and in which are shown by way of illustration specific embodiments in which the subject matter disclosed herein may be practiced. In one embodiment computer may be a binary system computer; in one embodiment computer may be a quantum system computer. Present disclosure should not be construed as being limited to specific type of computer architecture or system, instead the term instead term computer or processor should be taken to mean any computing or processing capability of any kind. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

Multimedia system disclosed, in present patent application, has an output aspect; taking multimedia data and outputting in a media relevant manner to the media relevant output device. In one embodiment, the SCL multimedia system implements functionality of taking as an input multimedia stream consisting of different media types and splits it into constituent parts. Whereas each constituent media stream is consequently pushed into the media type specific data delivery path.

Thus, FIG. 1 depicts an apparatus/component diagram detailing components of such a system. At 108 depicts multimedia stream, which could be a multimedia file or continuous stream with data that may include visual, audio, text, or any other type of data. The data stream may be encrypted or compressed or raw format. The Multimedia data stream may be serialized or block data. For example, Multimedia stream(s) stream may be in the format of MPEG [2,3,4], AVI or others.

Component 107 is a multimedia processor that per-processes multimedia data, optionally separates it into multiple streams and prepares for transmission to paired parts of the multimedia system. Multimedia processor functions as a demultiplexer of various types of data that are sourced as one dataset. Multimedia processor(s) may perform any data manipulation necessary for optimal quality. Data manipulation may include, but not be limited to: compression, encryption, error checking, equalization, filtering, etc. . . . . In one non-limiting, exemplary embodiment, as part of its function, multimedia processor decides on the route that each separate data stream should take to a paired output part of multimedia system; that is, audio stream should be routed to audio output device, video or image stream should be routed to video or image output device. In one non-limiting, exemplary embodiment, as part of its function, multimedia processor may perform any data manipulation necessary for optimal quality of output or optimal transmission to the target device. In one exemplary, non-limiting embodiment multimedia processor may be implemented as hardware solution. In one, non-limiting, exemplary embodiment, multimedia processor may be implemented as a software solution and in one non limiting, exemplary embodiment it may be implemented as combination of software and hardware. The multimedia processor may comprise various electronic or micro electronic or nano electronic components. It may comprise processing unit(s) as well as memory components, it may also comprise communication unit.

Components 103-106 comprise a set of transmitters and receivers used to facilitate transmission and routing of data between all of the components of the multimedia system. The multimedia SCL system may comprise at least one transceiver pair, or at least one set or more, of transmitters, receivers and transceivers, and their combinations. In one exemplary embodiment, component 105 depicts video channel transceiver that transmits video or image stream to the integrated receiver on an SCL. It may use various media for transmission, for example radio, or light transmission, wired or wireless medium. In one exemplary embodiment, component 106 depicts audio channel transceiver that transmits audio data to the integrated receiver on an audio emitting device. It may use various media for transmission, for example radio, or light transmission, wired or wireless medium. Transceiver(s) may comprise electronic, micro electronic or nano electronic components or optical, or electro-optical components configured to send and receive data.

In one non limiting, exemplary embodiment components 105 and 106 may be implemented as wired antenna on receiving side and RF Generating antenna on sending side. In one non limiting, exemplary embodiment components 105 and 106 may be implemented as laser generating beam component located near the eye and light sensor/detector receiver on integrated into the contact lens. In one non limiting, exemplary embodiment components 105 and 106 may be implemented as wired antenna on receiving side and RF Generating antenna on sending side. In one non limiting, exemplary embodiment components 105 and 106 may be separate physical devices or they maybe one device capable of transceiving data of different types over different channels at sequentially or concurrently.

In one exemplary embodiment, component 104 depicts audio channel receiver that receives audio data and makes it available on an audio emitting device. It may use various media for transmission, for example radio, or light transmission, wired or wireless medium. In one exemplary embodiment, component 104 depicts communication unit, which is part of communication component, it may comprise a receiver or transceiver and may support two way communication between 102 component and multimedia processor. 104 is a communication unit arranged to connect and receive and sent data wirelessly to external communication unit that can also consist of receiver or transceiver.

In one exemplary embodiment, component 102 delivers audio to the user. It may comprise one or multiple sound reproducing elements, audio amplifier and may be coupled with a sound capturing device, such as a microphone. In one exemplary embodiment, component 101 delivers image or video data to the user. It may comprise one or more two near the eye, transparent, semitransparent, or non-transparent, projection, waveguide, or any other type of micro display embedded in the contact lens substrate. Present SCL based multimedia system is arranged to deliver image or video content directly to the retina of the user's eye.

The image or video data received by communication component 103 and 105 is a communication component consisting of embedded into the contact lens substrate receiver or transceiver aka communication unit as well as 105 communication unit consisting of external to the contact lens receiver or transceiver. where 103 and 105 communication units are arranged to communicate with each other. Components 103 and 105 are paired communication units. In one non limiting, exemplary embodiment, Video Transceiver component 103 may be implemented as an integrated into the contact lens wireless communication component. Embedded, integrated, into the contact lens substrate, communication component may implement wifi or bluetooth communication protocol or any other protocol including but not limited to RaayonNova proprietary IOT communication protocol. The image or video data received by communication component 103 is further fed to an onboard integrated display embedded into the contact lens substrate component 101. In one non limiting, exemplary, embodiment, video or image data receiver or transceiver is integrated into the smart contact lens. An SCL, will output the image or video received to the embedded display. The display device may be implemented as projection type or waveguide type or LED or OLED or LCD or any other type of passive or active micro display or projector or femptoprojector type of display.

Figure 2:
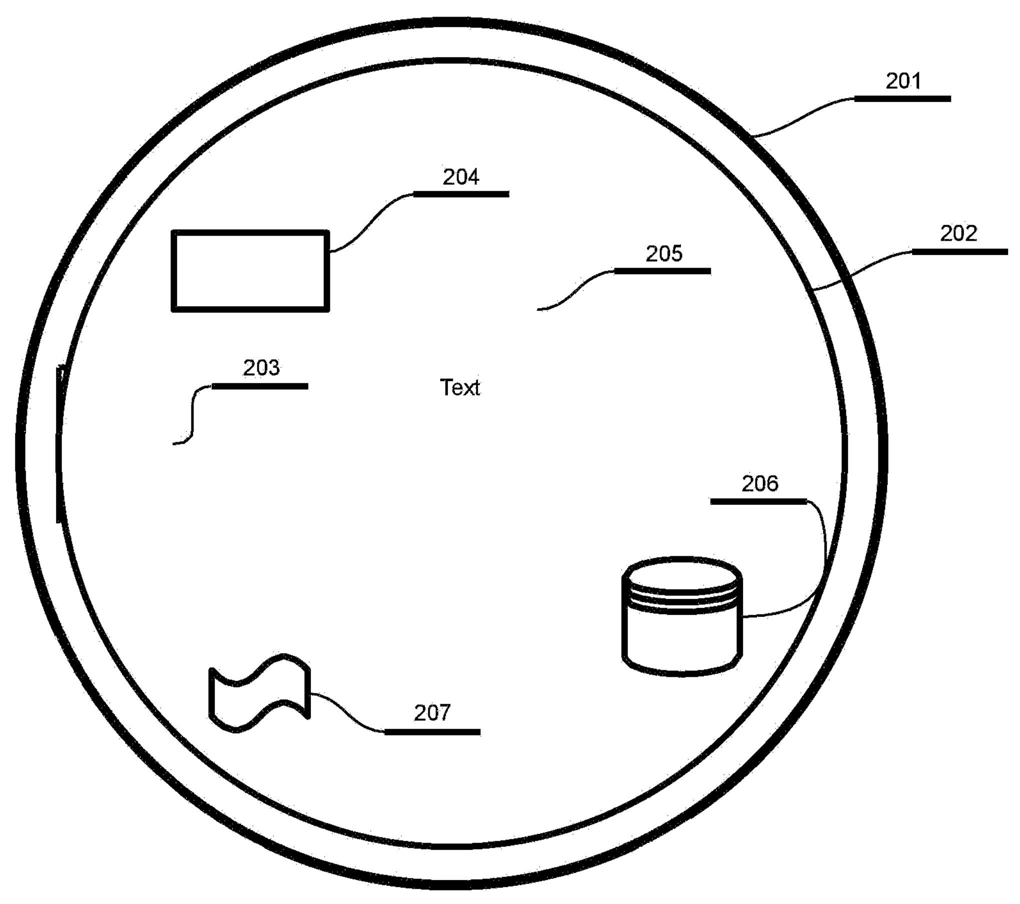
FIG. 2 illustrates a active/smart contact lens system 86 its substrate with number of electrical or electro-optical components embedded within in accordance with an embodiment of the present disclosure.

FIG. 2, depicting active/smart contact lens substrate 201, with number of electrical or electro-optical embedded components. In one exemplary, embodiment, component 202 denotes wireless antenna of communication component. Communication component further may comprise communication component controller 203. In one exemplary embodiment antenna 202 and communication controller may be implemented as part of the same electronic circuitry and as part of the same device. In one exemplary, non limiting embodiment antenna 202 and communication controller may be implemented as part of the different electronic circuitry and as part of the same device.

In one exemplary, non limiting embodiment, contact lens substrate contains, microdisplay controller 204 and embedded display unit 205. Whereas, embedded display unit 205 may be maybe implemented as transparent, semi-transparent, or non transparent or semi transparent, projection, waveguide, or any other type of display integrated into contact lens substrate. Display controller 204 receives video data from communication component 203, stores and processes image or video data in preparation for output to the embedded display unit 205. It may optionally include any processing and optimization of image or video data that will be displayed. It may optionally include decompression, overlaying, scaling, transformation, filtering, shift and any other functions that may be necessary to facilitate preparation and interfacing with the embedded display.

In one exemplary, non limiting embodiment display controller may function as image stabilizer. Display controller may receive information about changing orientation vector of the eye and may smoothen the image changes. Display controller may cancel out effect of micro saccading. Also Display controller may compute how the image should appear on embedded display based on current 2 dimensional orientation of the contact lens relative to the meridian of the eye. Sometimes, contact lens may shift on the eye, as a result of, for example, non voluntary eye blinking. Display controller may track disposition of the contact lens on in 2 dimensions or in 3 dimensions and may further adjust disposition of an image on display to make it appear stationary.

In one exemplary, non limiting embodiment, display controller 204 may be configured to output data, received from communication component 203, to an onboard memory component 206. Onboard memory component 206 may be maybe embedded into contact lens substrate as a stand alone electronic device or may be integrated into the display controller component 204. The system may further be configured to fetch image or video data from memory component 206 to be output to the embedded display component 205 on a need to basis. Depending on the implementation display controller 204 may be hardware based, software based, or may combine both hardware and software. Component 204 may be an optional component. In one non limiting exemplary embodiment, data may be delivered real time with, without, or with minimal manipulation, or stored in memory for parallel or delayed processing.

In one, non-limiting, exemplary embodiment, communication component 203 may be maybe implemented as a MEMS device. In one, non-limiting, exemplary embodiment, communication component 203 may be maybe implemented as a nano or micro scale electronic device. In one, non-limiting, exemplary embodiment, communication component 203 may be maybe implemented as a quantum device. In one, non-limiting, exemplary embodiment, communication component 203 may be implemented as a Optical device or electro-optical device. In one, non-limiting, exemplary embodiment, communication component 203 may implement variety of proprietary and non publicly known or publicly known communication protocols, for example WiFi or Bluetooth or proprietary RaayonNova communication protocol.

In one, non-limiting, exemplary embodiment, display controller 204 may consist of, but not be limited to: DMA Control unit, Video Sync Generator unit, Microcontroller Interface Status & Data Read Registers unit, Memory Timing Generator, FIFO Buffer, Zoom and Pan Controller, Drawing Controller, Command Processor Control ROM unit, Parameter RAM, Display Memory Controller with Refresh Counter, Light Pen Register Logic and other components. In one, non-limiting, exemplary embodiment, display controller 204 may be implemented as a MEMS device. In one, non-limiting, exemplary embodiment, display controller 204 may be implemented as a nano or micro scale electronic device. In one, non-limiting, exemplary embodiment, display controller 204 may be implemented as a quantum device. In one, non limiting, exemplary embodiment display controller 204, is configured to control display; in that it displays controller may control which pixels are on and off at any given time, display controller may control what coloration should be selected for each pixel. In one, non limiting, exemplary embodiment display controller may be implemented as VDC (video display controller) also known as display engine or display interface. In one, non limiting, exemplary embodiment display controller may be implemented as graphical processing unit.

In one, non-limiting, exemplary embodiment, micro display 205 embedded into the contact lens substrate. Micro display 205, may be implemented as non transparent, or semi transparent, transparent, projection, waveguide, or any other type of display. The said display component 205 may be implemented as projector, femto projector or ELD, LCD, LED (OLED or AMOLED) or Backlit LCD, TFT, PDP QLED or any other passive or active display technology designed to produce visual imagery. Micro display may have a focusing component attached as part of its implementation.

In one, non-limiting, exemplary embodiment, memory storage 206 component is embedded into the contact lens substrate. It is used for image or video data storage and data processing and further for outputting image or video data to the embedded display.

Memory storage 206 component may store data temporarily or permanently and may be implemented as DRAM, SRAM, PROM, MROM, EPROM, EEPROM, solid state, optical, magnetic. It may comprise a Any type of volatile or nonvolatile memory implementation. In one, non-limiting, exemplary embodiment, memory storage 206 component may comprise any type of volatile or non-volatile memory, or a combination thereof. In one, non-limiting, exemplary embodiment, memory storage 206 component, may be implemented as a quantum or binary device or any other type of device capable of registering and retaining and retrieving any type of information. In one, non-limiting, exemplary embodiment, memory storage 206 may be implemented as a nano or micro scale electronic device.

In one, non-limiting, exemplary embodiment, orientation sensor 207 may be implemented as a nano or micro scale electronic device. In one exemplary, non limiting embodiment, orientation component 207 may be implemented as accelerometer. In one exemplary, non limiting embodiment, orientation component 207 may be implemented as electronic compass or magnetometer. In one exemplary, non limiting embodiment, any type of orientation sensor component or 207 may be implemented as electronic gyroscope. In one exemplary, non limiting embodiment, may be implemented as a flex sensor. In one exemplary embodiment, orientation component 207 may be implemented as motion sensor. In one exemplary, non limiting embodiment, orientation component 207 may be implemented as Inertial Measurement Units (IMU) or as tilt sensors or as Inertial Navigation Systems (INS).

Figure 3:
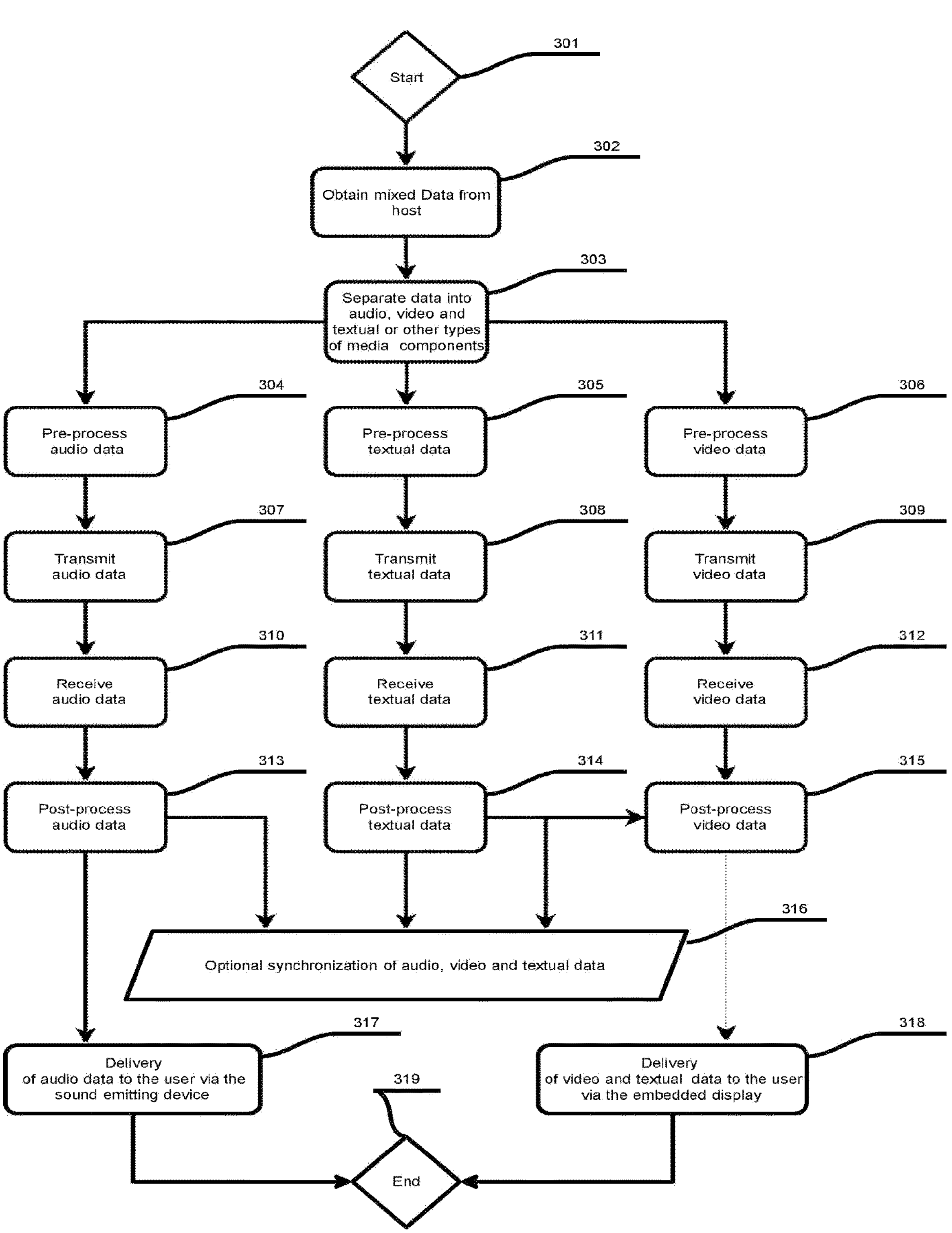
FIG. 3 is a flow diagram depicting Process flow for acquiring multimedia data, decomposing it into individual media streams, and providing it to a processor designed specifically for processing media on an output device.

FIG. 3 depicts process flow of obtaining multimedia data, splitting it into constituent media streams and delivering data to media specific processor on output device for media specific means of output. The process flow starts at 301, that denotes start of the process. Step 301 may comprise, user triggered or system triggered action, for example: press of a button or selection, or system generated event, where multimedia data flow commences. At step 302, we obtain multimedia information as a mixed media data set. Further at step 303, the system pushes multimedia stream via demultiplexer/splitter. Splitter separates media data into a separate media specific streams. In one exemplary, non-limiting embodiment, multimedia stream contains multimedia stream may contain audio data. In one exemplary, non-limiting embodiment, multimedia stream contains multimedia stream may contain video data. In one exemplary, non-limiting embodiment, multimedia stream contains multimedia stream may contain text data. Multimedia stream may contain other types of media data.

At step 304 the system may optionally pre-process audio stream. Pre-processing audio stream may include but not be limited to format transformation, bit rate conversion optimization, channel separation or combination of channels, equalizer functions, normalization of volume, rate compression, encryption. In one exemplary, non-limiting embodiment, at step 305 the system may optionally pre-process text stream, Pre-processing text stream may include but not be limited to textual grammar checks, variety of natural language processing capabilities may be applied, text replacement, correlation of text and audio stream. In one exemplary, non-limiting embodiment, at step 305, the system may generate text based by processing audio or video streams and running voice recognition and image recognition algorithms on available data streams. In this implementation the generated text can be further passed for additional processing. At step 306 the system may optionally pre-process video or image stream, Pre-processing image or video stream may include but not be limited to resolution, encryption, error checking, video filtering, color gamut, aspect ratio adjustments and other image or video stream parameters may be changed at this stage.

At step 307 the system transmits audio data to the audio receiving device. Data may be sent wirelessly or via wire or via light beam to the receiving device. At step 308 the system transmits text data to the text receiving device. Data may be sent wirelessly or via wire or via light beam to the receiving device. In one exemplary, non-limiting embodiment, every sender may transmit specific data stream to one or multiple data consumers and corresponding data stream receivers. At step 309 the system transmits image or video data to the image or video receiving device. Data may be sent wirelessly or via wire or via light beam to the receiving device.

At step 310 the audio receiving device receives audio stream. At step 311, an SCL or audio outputting device may receive textual data. At step 312, SCL device(s) receive(s) video or image data. At step 313, audio data stream gets post-processed, this step may include but not be limited to decompression, decryption, bit rate change and etc. At step 314, textual data is post-processed. Textual data post-processing may comprise but not be limited to stream, Pre textual grammar checks, variety of natural language processing capabilities may be applied, text replacement, correlation of text and audio stream and other processing. At step 315, video or image data is post-processed. Post-processing image or video stream may include but not be limited to resolution, encryption or decryption, error checking, video filtering, color gamut, aspect ratio adjustments and other image or video stream parameters may be changed at this stage. In one exemplary, non limiting embodiment steps 314 and 315 may be cojoined with an additional processing of overlaying text onto video or image data stream. At step 316, the system optimizes media streams.

At step 317, the system outputs audio stream, that has been optionally pre-processed to the audio outputting device. Audio outputting device may comprise headphones, speaker or other audio emitting devices. At step 318, the system outputs imagery or video stream data to the user. Video or imagery is output on the display embedded into the SCL. At step 319, the diagram indicates the end of the process. End of the process may signify, system or user triggered action, for example user choosing to close and terminate application showing multimedia data to the user or schedule based activity makes the system to terminate the multimedia stream to stop.

Figure 4:
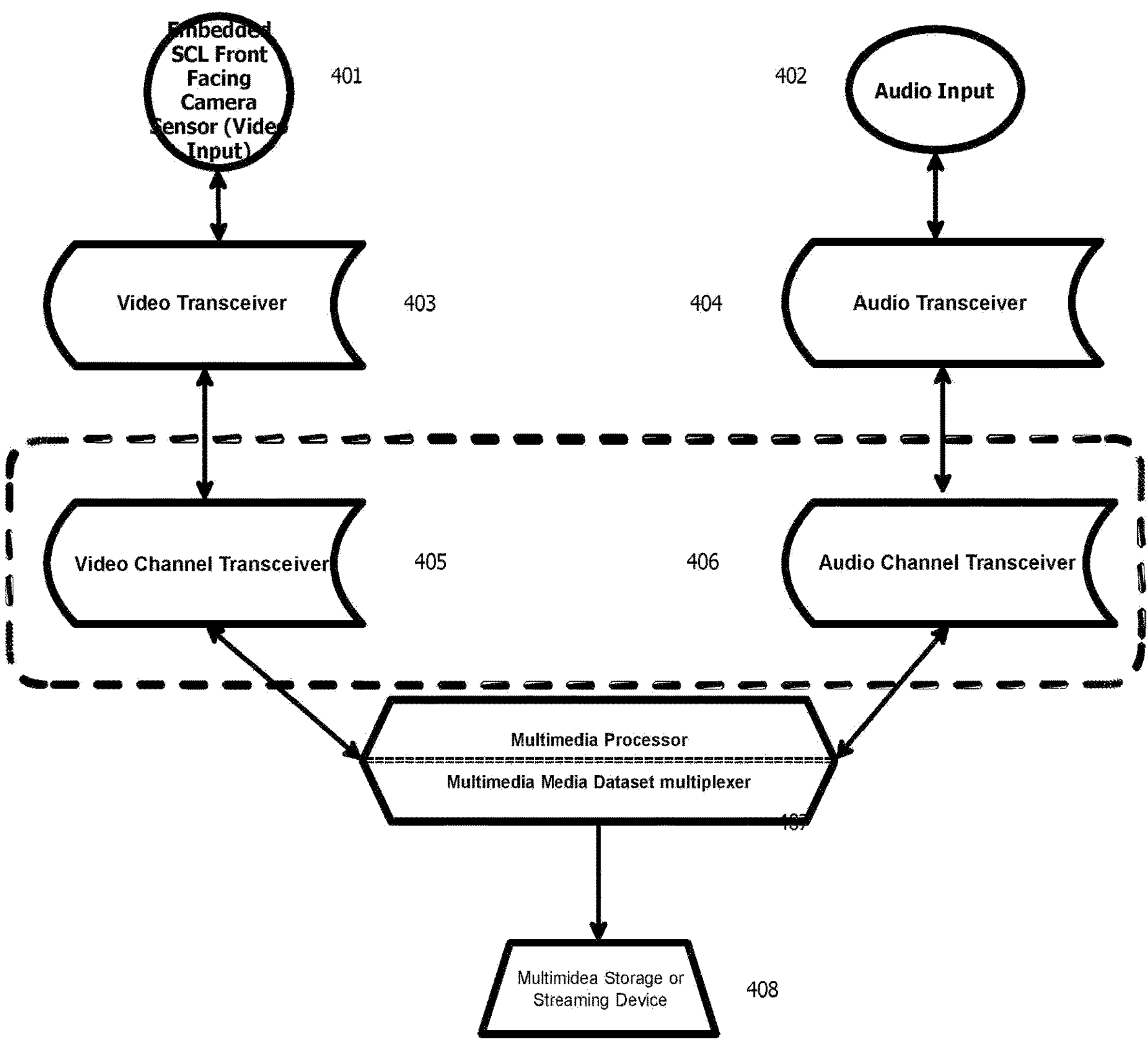
FIG. 4 is a flow diagram illustrating the input and output aspect of the multimedia processor in accordance with an embodiment of the present disclosure

Multimedia system disclosed, in present patent application, has an input aspect; registering different media producing joint dataset, usually represented by multimedia stream or file as per FIG. 4, an image or video capture device 401 is embedded into the contact lens substrate. Image or video capture capture device is front facing and is positioned perpendicularly relative to the eye to be oriented on the same vector as the line of sight of the eye.

In one, non-limiting, exemplary embodiment, image sensor 401, can be implemented as CMOS (complementary metal oxide semiconductor) or CCD (charge coupled device) sensor or any other sensor capable of registering light. Image capture device 401 may be optionally coupled with a focusing component. Focusing component is configured to focus light onto the image sensor. Image capture sensor may be implemented as micro electronic component or as nano scale component. In one, non-limiting, exemplary embodiment, image capture device 401 may also contain or be operatively coupled with image sensor controller where, in one exemplary embodiment, image sensor controller may be optionally arranged and implemented as a display controller. In one, non-limiting, exemplary embodiment, image sensor controller may be implemented as a separate device from display controller. In one exemplary embodiment, component 401 captures image or video data. It may comprise one or more front facing cameras embedded in the contact lens substrate, alternatively, some or all image capture devices may be integrated into near the eye auxiliary devices, such as smart glasses, etc.

In one non limiting, exemplary embodiment, Video Transceiver component 403 may be implemented as an integrated into the contact lens wireless communication component. Embedded into the contact lens substrate, communication component may implement wifi or bluetooth communication protocol or any other protocol including but not limited to RaayonNova proprietary IOT communication protocol. The image or video data received by communication component 403 is further fed to an onboard display embedded into the contact lens substrate component 401. In one non limiting, exemplary, embodiment, video or image data receiver is embedded into the smart contact lens. An SCL, will output the image or video received to the embedded display.

Multimedia system may optionally include one or more sound capture device 402. In one, non-limiting, exemplary embodiment, sound capture device may comprise one or multiple transducers, or microphones. It may also capture ambient sounds. It may comprise one or multiple sound capturing devices, such as a microphone; it may include audio amplifiers and may be coupled with a sound producing components for feedback.

Video transceiver component 403 takes data from image capture device 401 either directly or after pre-processing. In one exemplary embodiment, component 404 depicts audio channel transmitter that receives audio data from the sound capturing device and transmits it to the central multimedia control unit, or another device in the system. It may use various media for transmission, for example radio, or light transmission, wired or wireless medium. In one exemplary embodiment, component 404 may also be a transceiver and support two way communication between 402 component and multimedia processor.

Components 403-406 Comprise a set of transmitters and receivers used to facilitate transmission and routing of data between all of the components of the multimedia system. The multimedia SCL system may comprise at least one transceiver pair, or at least one set or more, of transmitters, receivers and transceivers, and their combinations. Transmission medium may include, but is not limited to, radio, or light transmission over a wired or wireless medium, or any other mode of transmission, or a combination thereof.

In one exemplary embodiment, component 405 depicts video channel transceiver that receives video or image stream from video transceiver 403 and video capture device 401, and outputs it to multimedia processing device and other devices in the system. It may use various media for transmission, for example radio, or light transmission, wired or wireless medium.

In one exemplary embodiment, component 406 depicts audio channel transceiver that receives audio data from the audio capture device, and outputs it to the multimedia processing device and other devices in the system. It may use various media for transmission, for example radio, or light transmission, wired or wireless medium. Transceiver array is not limited to 4 transceivers, it may have any number of transceivers to facilitate communication between system components. Furthermore, it may comprise electronic, micro electronic or nano electronic components configured to send and receive data in any standard, or proprietary format and utilizing any standard or proprietary medium.

In one exemplary embodiment components 403, 404, 405, 406 and any additional transceivers may be separate physical devices or they may be one device capable of transceiving data of different types over different channels or sequentially or concurrently.

Component 407 comprise multimedia processor and media channel multiplexer as separate, or integrated components. Multimedia processor functions may include but are not limited to analytics, transformation, mixing, filtering, equalizing, recognition, formatting, synchronization, quality optimisation, or any other type of function that might be necessary for processing of each received data stream, either as separate or combined channels. The multiplexer combines and packages any available streams, such as video, audio, text, and other forms of data into one stream. Output of component 407 may be further sent to multimedia storage device, or streaming device 408, or any other type of device for further storage, streaming, or processing.

Figure 5:
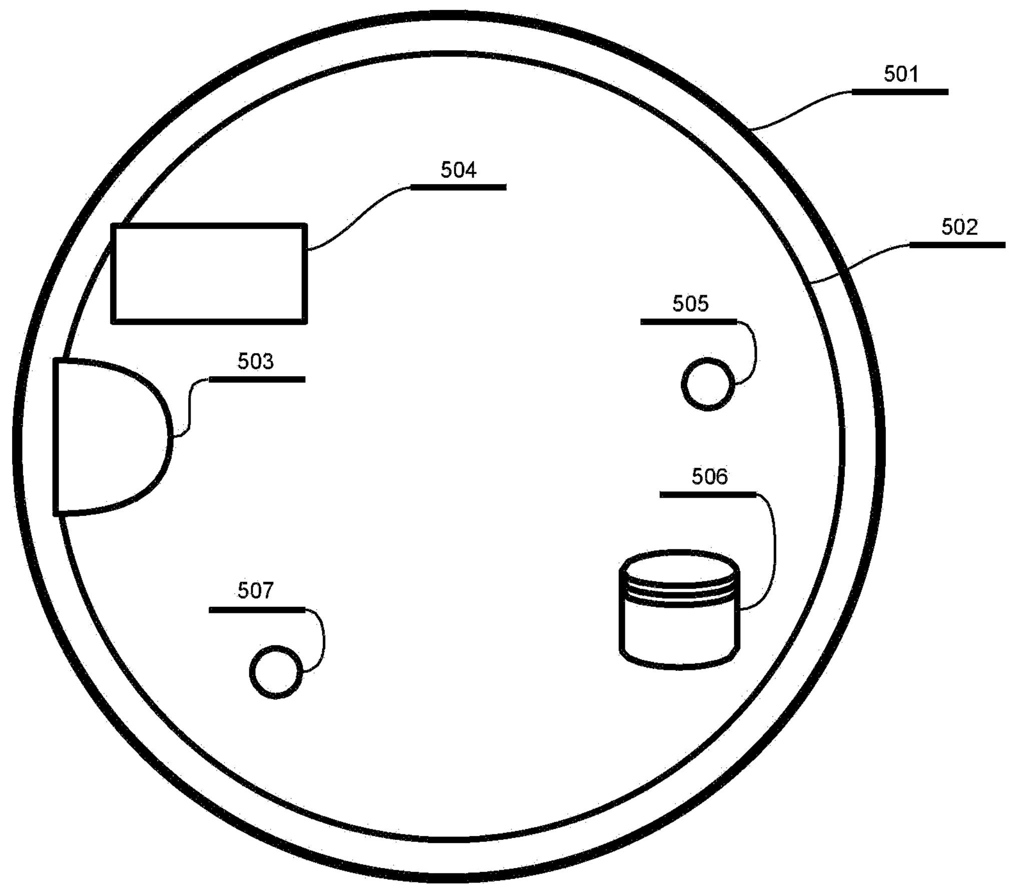
FIG. 5 is a block diagram depicting active/smart contact lens substrate, with number of electrical or electro-optical embedded sensors and assisting components.

FIG. 5, depicting active/smart contact lens substrate 501, with number of electrical or electro-optical embedded components. In one exemplary embodiment, contact lens substrate contains one or multiple electronic components, such as, but not limited to, embedded, forward facing, micro image or video camera 505, microphone 507, camera and microphone controller 504, memory component 506, communication component 503, and antenna 502. Whereas, embedded video camera 505 may be implemented as CMOS sensor or CCD sensor or any other type of sensor reactive to light.

In one, non-limiting, exemplary embodiment, micro video camera 505 is embedded into the contact lens substrate. In one exemplary embodiment, camera controller 504 receives video data from video camera 505, stores and processes image or video data in preparation for output to the external devices via the embedded communication device 503. It may optionally include any processing and optimization of image or video data that will be transmitted and/or stored. It may optionally include compression, overlaying, scaling, transformation, filtering, shift and any other functions that may be necessary to facilitate preparation of the data for transmission, storage, or both, and for interfacing with the embedded devices.

In one, non-limiting, exemplary embodiment, camera controller 504 may consist of, but not be limited to: DMA Control unit, Video Sync Generator unit, Microcontroller Interface Status & Data Read Registers unit, Memory Timing Generator, FIFO Buffer, Zoom and Pan Controller, Drawing Controller, Command Processor Control ROM unit, Parameter RAM, Display Memory Controller with Refresh Counter, Light Pen Register Logic and other components.

In one, non-limiting, exemplary embodiment, camera controller 504 may be implemented as a MEMS device. In one, non-limiting, exemplary embodiment, camera controller 504 may be implemented as a nano or micro scale electronic device. In one, non-limiting, exemplary embodiment, camera controller 504 may be implemented as a quantum device.

In one, non-limiting, exemplary embodiment, memory storage 506 component is embedded into the contact lens substrate. It is used for image or video data storage and data processing and further for outputting image or video data to the embedded display. Memory storage 506 component may store data temporarily or permanently and may be implemented as DRAM, SRAM, PROM, MROM, EPROM, EEPROM, solid state, optical, magnetic. Any type of volatile or nonvolatile memory implementation. In one, non-limiting, exemplary embodiment, memory storage 506 component may comprise any type of volatile or non-volatile memory, or a combination thereof. In one, non-limiting, exemplary embodiment, memory storage 506 component, may be implemented as a quantum device or any other type of device capable of registering and retaining and retrieving any type of information. In one, non-limiting, exemplary embodiment, memory storage 506 may be implemented as a nano or micro scale electronic device.

In one exemplary, non limiting embodiment, camera controller 504 may be configured to output data, received from video camera 505, to an onboard memory component 506. Onboard memory component 506 may be embedded into contact lens substrate as a stand alone electronic device or may be integrated into the camera controller component 504. The system may further be configured to fetch image or video data from memory component 506 to be output to external components via the embedded communication component 503, or used for local processing on a need to basis.

In one, non-limiting, exemplary embodiment, communication component 503 may be implemented as a MEMS device. In one, non-limiting, exemplary embodiment, communication component 503 may be implemented as a nano or micro scale electronic device. In one, non-limiting, exemplary embodiment, communication component 503 may be implemented as a quantum device. In one, non-limiting, exemplary embodiment, communication component 503 may be implemented as a Optical device. In one, non-limiting, exemplary embodiment, communication component 503 may implemented variety of proprietary or non publicly known communication protocols, for example WiFi or Bluetooth or proprietary RaayonNova communication protocol.

In one exemplary, embodiment, component 502 denotes wireless antenna of communication component. Communication component further may comprise communication component controller 503. In one exemplary embodiment antenna 502 and communication controller may be implemented as part of the same electronic circuitry and as part of the same device. In one exemplary embodiment antenna 502 and communication controller may be implemented as part of the different electronic circuitry and as part of the same device.

Figure 6:
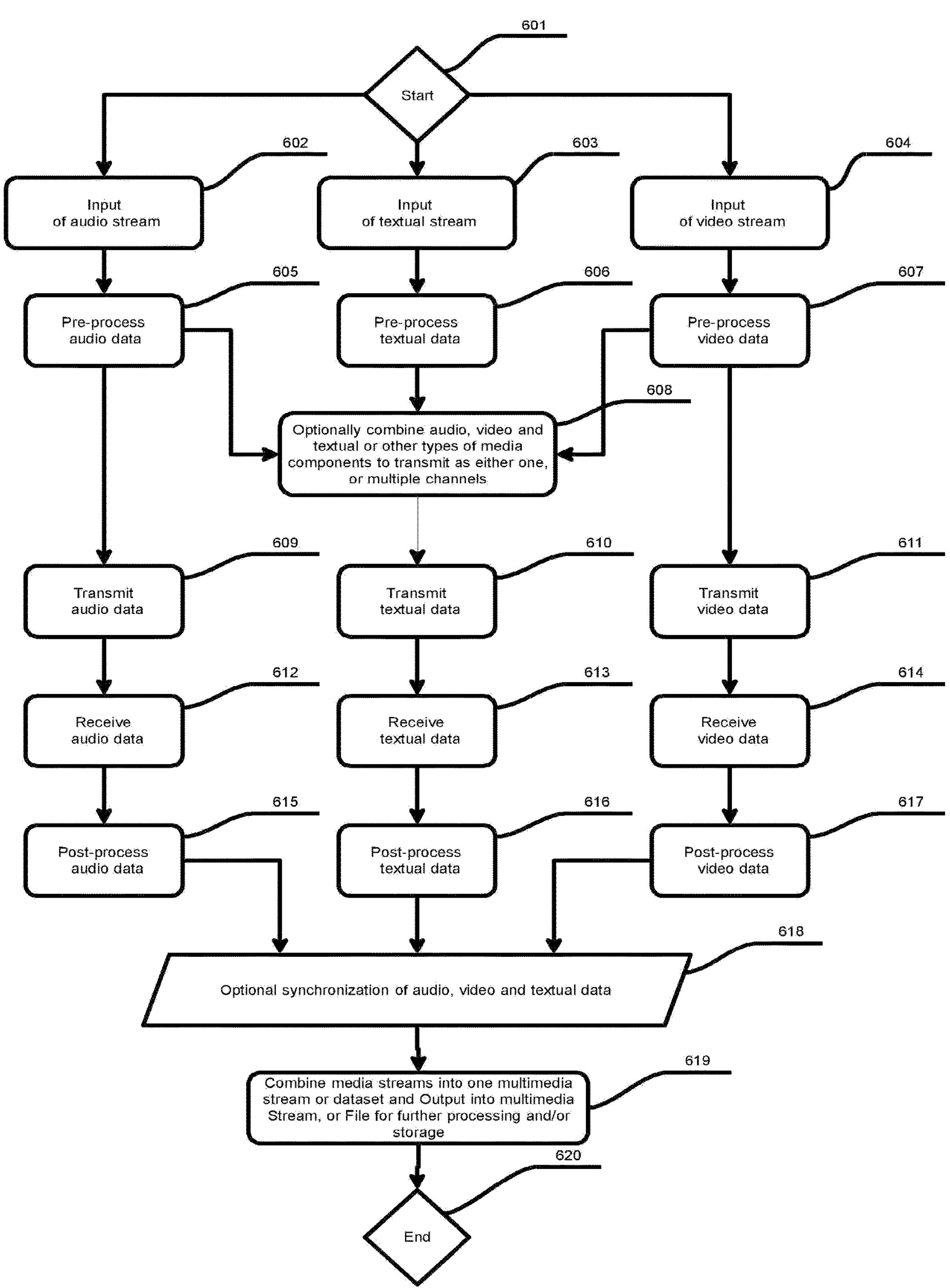
FIG. 6 is a illustrative process flow diagram depicting an a process generation of multimedia file based from various media gathering and registering devices and sensors.

FIG. 6, describes process flow of generation of multimedia file based from various media gathering and registering devices and sensors. The process starts at 601. At step 602, audio is registered and is provided as an input into the process. Audio may be registered with any microphone. At step 603, the system registers text as a picture with an image or video sensor, then image recognition may be applied on an input text imagery. Further textual data may be feed into the textual pre processor. At step 604, the system registers image or video, with image or video sensor. Image or video capture sensor is integrated into the smart contact lens and is forward facing. At step 605, the system performs pre-processing of audio data. Pre-processing audio stream may include but not be limited to format transformation, bit rate conversion optimization, channel separation or combination of channels, equalizer functions, normalization of volume, rate compression, encryption and other transformations. At step 606, the system performs pre-processing of textual data. Pre-processing text stream may include but not be limited to textual grammar checks, variety of natural language processing capabilities may be applied, text replacement, correlation of text and audio stream. At step 607, the system performs pre-processing of image or video data. At step 608, the system combines all involved media channels into one multimedia data stream, multimedia dataset for further storage or transmission. At step 608 either all involved multimedia channels may be morphed into one stream or only some of the related multimedia channels will be morphed into one multimedia channel. The combined stream format may be any existing multimedia format and may include but not be limited: mov, mp4, .m4a, .m4v, .mpg/.mpeg, .wmv, .avi, .flv, .3gp, .3gpp, .3g2, .3gp2, Matryoshka media container and other formats and informational structures.

In one non limiting, exemplary embodiment, at step 609, the system performs optionally audio stream transmission to receiving component. In one non limiting, exemplary embodiment, at step 610, the system performs optionally textual stream transmission to receiving component. In one non limiting, exemplary embodiment, at step 611, the system performs optionally video stream transmission to receiving component. In one non limiting, exemplary embodiment, at step 611, the system performs optionally transmit the combined multimedia stream over one or multiple channels to a receiving component. In one non limiting, exemplary embodiment, at step 612, the receiving component responsible for audio processing receives audio stream for further processing. In one non limiting, exemplary embodiment, at step 613, the receiving component responsible for textual processing receives textual stream for further processing. In one non limiting, exemplary embodiment, at step 614, the receiving component responsible for image or video processing receives image or video stream for further processing. In one non limiting, exemplary embodiment, at step 614, the receiving component responsible for combined multimedia stream processing receives combined multimedia stream for further processing. In one non limiting, exemplary embodiment, at step 615, the system performs any post processing steps on audio stream including but not limited to decompression, decryption, bit rate change and etc. In one non limiting, exemplary embodiment, at step 616, the system performs any post processing steps on textual stream including but not limited to textual grammar checks, variety of natural language processing capabilities may be applied, text replacement, correlation of text and audio stream and other processing. In one non limiting, exemplary embodiment, at step 617, the system performs any post processing steps on image or video including but not limited to resolution, encryption or decryption, error checking, video filtering, color gamut, aspect ratio adjustments and other image or video stream parameters may be changed at this stage. In one non limiting, exemplary embodiment, at step 617, the system performs any post processing steps on combined or separate multimedia stream(s). In one non limiting, exemplary embodiment, at step 618, the system performs optimizations, synchronization between different multimedia channels. In one non limiting, exemplary embodiment, at step 619, system optionally combines all or some media streams into one multimedia stream or dataset for further storage or transmission or processing.

The process ends at step 620.

What is claimed:

1. A smart contact lens (SCL) based multimedia system comprising:

a contact lens substrate comprising an embedded display component configured to present visual content to a user;

an audio output device configured to emit audio content;

at least one communication unit comprising a data receiver or transceiver configured to receive or send data wirelessly to and from an external communication unit; and a multimedia processor operatively connected to the embedded display component and the audio output device, wherein the multimedia processor is configured to receive a multimedia stream comprising at least video and audio content, to demultiplex the multimedia stream into separate video and audio streams, and to direct the video stream to the embedded display component and the audio stream to the audio output device in temporal synchronization.

2. The smart contact lens system of claim 1, wherein the multimedia processor is configured to receive the multimedia stream from an external source over a wireless or wired communication interface, or to retrieve the multimedia stream from a memory device integrated into the multimedia processor.

3. The smart contact lens system of claim 1, wherein the multimedia processor is either (i) onboard and integrated into the contact lens substrate, or (ii) offboard as an external component operatively connected to the smart contact lens system.

4. The smart contact lens system of claim 1, wherein the at least one communication unit is configured to transmit each demultiplexed data stream to a corresponding data-type-specific receiver or transceiver of a paired external communication unit.

5. The smart contact lens system of claim 1, wherein the multimedia processor is further configured to add text data to the video stream, wherein the text data is generated in real time by analyzing at least one of the demultiplexed audio or video streams, or is received as part of the multimedia source data stream.

6. A smart contact lens (SCL) based multimedia system comprising:

a contact lens substrate;

a multimedia processing device operatively connected to the smart contact lens and configured to receive and process multimedia data, wherein the multimedia processing device combines one or more of an audio stream, an image stream, a video stream, and a text stream to form a mixed multimedia dataset;

an image capture device or a video capture device positioned to acquire visual data from a forward-facing field of view and configured to transmit said visual data to the multimedia processing device;

a communication interface configured to exchange multimedia data with an external communication unit; and the external communication unit comprising a multimedia transceiver configured to transmit or receive image or video data.

7. The smart contact lens system of claim 6, further comprising:

an audio capture device, external to or embedded within the contact lens substrate, wherein the audio capture device is configured to capture one or more audio channels and to transmit the captured audio to the multimedia processing device for at least one of recording, retransmission, or processing into a multimedia data stream.

8. Smart contact lens system of claim 6, further comprising:

external multimedia transceiver or transmitter of audio data.

9. A method of operating a smart contact lens-based multimedia system, the method comprising:

presenting visual content to a user via a display component embedded in a contact lens substrate;

emitting audio content via an audio output device;

receiving or sending data wirelessly to and from an external communication unit via at least one communication unit comprising a data receiver or transceiver; and receiving, by a multimedia processor operatively connected to the embedded display component and the audio output device, a multimedia stream comprising at least video and audio content;

demultiplexing, by the multimedia processor, the multimedia stream into separate video and audio streams; and directing the video stream to the embedded display component and the audio stream to the audio output device in temporal synchronization.

10. The method of claim 9, further comprising:

generating, in real time, a text data stream by analyzing at least one of the demultiplexed audio stream or the demultiplexed video stream using a processing module; and overlaying the generated text data onto the video stream presented on the embedded display component of the contact lens substrate in temporal synchronization with corresponding audio or visual content.

11. The method of claim 9, further comprising:

pre-processing, after the demultiplexing, one or more of the audio, video, or text streams; and transmitting the pre-processed stream or streams to one or more of an audio receiving device, an image or video receiving device, or a text receiving device, wherein outputting of the audio stream is performed by the audio receiving device and outputting of the image or video stream to the embedded display component of the contact lens substrate is performed by the image or video receiving device.

12. The method of claim 11, wherein said transmitting is performed wirelessly or via wire or via light beam to the corresponding receiving device.

13. The method of claim 11, wherein the audio receiving device performs post-processing of the audio stream prior to outputting the audio stream, and wherein the image or video receiving device performs post-processing of the video stream prior to outputting the video stream.

14. A method for operating a smart contact lens-based multimedia system, the method comprising:

capturing, via an audio sensor, an audio stream;

capturing, via an image or video capture sensor integrated into the smart contact lens, one or more of an image stream or a video stream;

combining one or more of the audio stream, the image stream, the video stream, and a text stream to form a mixed multimedia dataset; and storing the mixed multimedia dataset in memory or transmitting the mixed multimedia dataset to an external communication unit.

15. The method of claim 14, further comprising:

pre-processing, prior to the combining, one or more of the audio stream, image stream, video stream, or text stream.

16. A non-transitory machine-readable medium storing one or more sequences of instructions which, when executed by one or more multimedia processors operatively connected to a smart contact lens-based multimedia system, cause the system to:

receive, from an external communication unit via a wireless interface, a multimedia data stream comprising at least video data and audio data;

demultiplex the multimedia data stream into separate data-type-specific streams including a video stream and an audio stream; and route the video stream to a display component embedded in a contact lens substrate, and route the audio stream to an audio output device in temporal synchronization.

17. The non-transitory machine-readable medium of claim 16, wherein the one or more-sequences of instructions further cause the smart contact lens-based multimedia system to:

receive, from an external computing unit, a real-time text stream, or demultiplex multimedia data to retrieve a text stream; and overlay the received or retrieved text onto the video stream presented on the embedded display component of a contact lens substrate in semantic and temporal synchronization.

18. The non-transitory machine-readable medium of claim 16, wherein the one or more sequences of instructions further cause the smart contact lens-based multimedia system to:

pre-process, after the demultiplexing, one or more of the streams obtained from the multimedia data stream; and transmit the pre-processed stream or streams to one or more of an audio receiving device, an image or video receiving device, or a text receiving device, wherein the audio receiving device outputs the audio stream and the image or video receiving device outputs the image or video stream to the embedded display component of the contact lens substrate.

19. The non-transitory machine-readable medium of claim 16, further comprising one or more instructions for:

capturing, via an audio sensor, audio data;

capturing, via an image or video capture sensor integrated into said smart contact lens, one or more of image data, video data and text data;

combining one or more of said audio data, image data, video data and text data to form a mixed media set;

storing said mixed media set in a memory;

and transmitting said mixed media set to an external communication unit.

20. The non-transitory machine-readable medium of claim 19, further comprising one or more instructions for pre-processing, prior to said combining, one or more of said audio data, image data, video data and text data.

21. A computer-implemented method executed by one or more multimedia processors operatively connected to a smart contact lens-based multimedia system, the method comprising:

receiving, from an external communication unit via a wireless interface, a multimedia data stream comprising at least two types selected from video data, audio data, and text data;

demultiplexing the multimedia data stream into separate data-type-specific streams including a video stream and an audio stream; and routing the video stream to a display component embedded in a contact lens substrate, and routing the audio stream to an audio output device in temporal synchronization.

22. The method of claim 21, further comprising:

receiving, from an external computing unit, a real-time text stream, or demultiplexing multimedia data to retrieve a text stream; and overlaying the received or retrieved text onto the video stream presented on the embedded display component of the contact lens substrate in semantic and temporal synchronization.

* * * * *